United States Patent
Mitchell et al.

[11] Patent Number: 6,056,484
[45] Date of Patent: May 2, 2000

[54] DEVICE AND METHOD FOR ADJUSTING THE POSITION OF CUTTING INSERTS MOUNTED IN A CUTTING TOOL

[75] Inventors: Robert N. Mitchell, Raleigh, N.C.; Glenn W. Sheffler, Blairsville; Ronald L. Dudzinsky, Derry, both of Pa.

[73] Assignee: Kennametal Inc., Latrobe, Pa.

[21] Appl. No.: 09/131,007

[22] Filed: Aug. 7, 1998

[51] Int. Cl.[7] ................................................. B23C 5/24
[52] U.S. Cl. ................................ 407/36; 407/41; 407/44; 407/53; 82/1.11
[58] Field of Search .................. 407/36–41, 44, 407/45, 47, 49, 53; 82/1.11; 408/156, 153, 1 R

[56] References Cited

U.S. PATENT DOCUMENTS

| | | | |
|---|---|---|---|
| 3,195,376 | 7/1965 | Bader . | |
| 3,785,746 | 1/1974 | Wolf et al. | 408/182 |
| 3,802,043 | 4/1974 | Garih . | |
| 3,834,829 | 9/1974 | Munro | 408/179 |
| 4,133,399 | 1/1979 | Herrmann . | |
| 4,428,704 | 1/1984 | Kalokhe | 408/156 |
| 4,533,281 | 8/1985 | Lacey . | |
| 4,547,100 | 10/1985 | Naccarato et al. | 407/39 |
| 4,780,029 | 10/1988 | Beck | 407/89 |
| 5,102,269 | 4/1992 | Arai et al. | 407/41 |
| 5,391,023 | 2/1995 | Basteck . | |

FOREIGN PATENT DOCUMENTS

| | | |
|---|---|---|
| 135452 | 2/1902 | Germany . |
| 3936243 | 5/1991 | Germany . |
| 858090 | 1/1961 | United Kingdom . |

*Primary Examiner*—Henry W. H. Tsai
*Attorney, Agent, or Firm*—Larry R. Meenan

[57] ABSTRACT

Both a device and method for adjusting the position of a cutting insert relative to the body of a cutting tool such as a milling cutter are provided. The device includes a cantilevered wall integrally connected to the tool body, that forms a portion of the pocket in the tool body that supports a side of the insert, and a wedge mechanism for elastically flexing the cantilevered wall to adjust the position of a cutting edge of the insert relative to the tool body. The wedge mechanism may take the form of a screw threadedly engaged to the tool body that has a conical head engaged against the cantilevered wall such that when the screw is turned, the conical wedge formed by the screw head flexes the cantilevered wall a small distance. The device advantageously allows fine adjustments to be made in the position of the cutting edge of an insert by the simple turning of a single screw. The method of the invention advantageously allows the adjusting device to be easily installed in conventional cutting tools having preexisting, insert-receiving pockets.

25 Claims, 4 Drawing Sheets

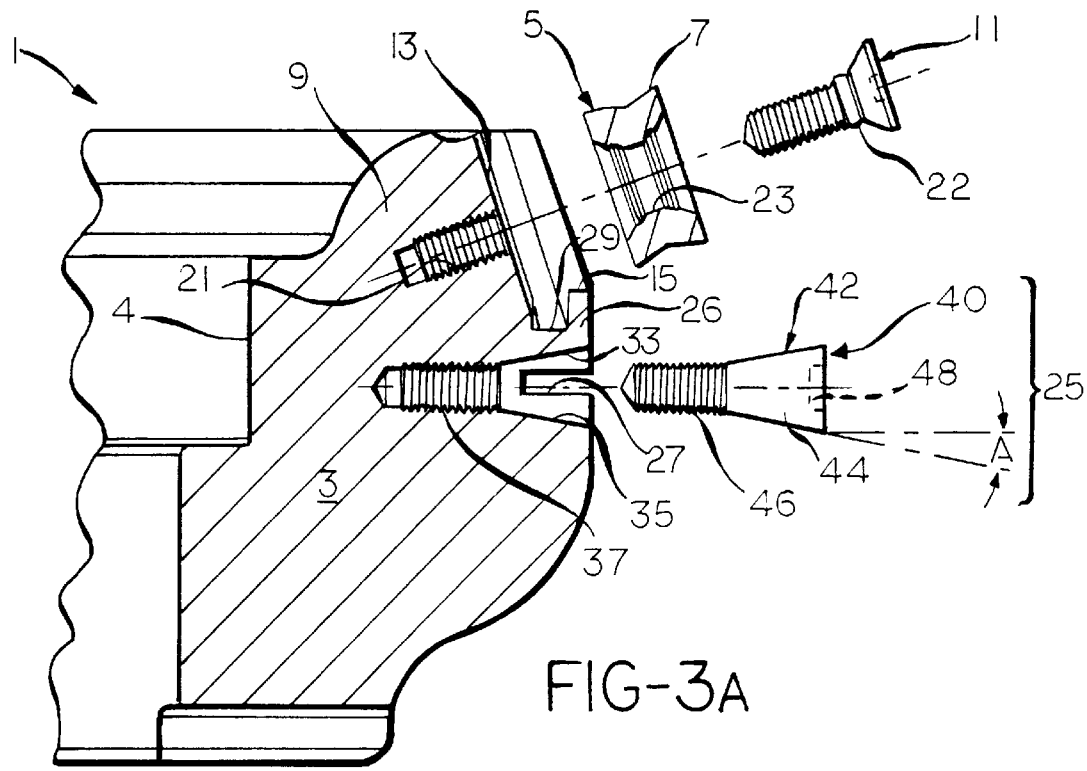
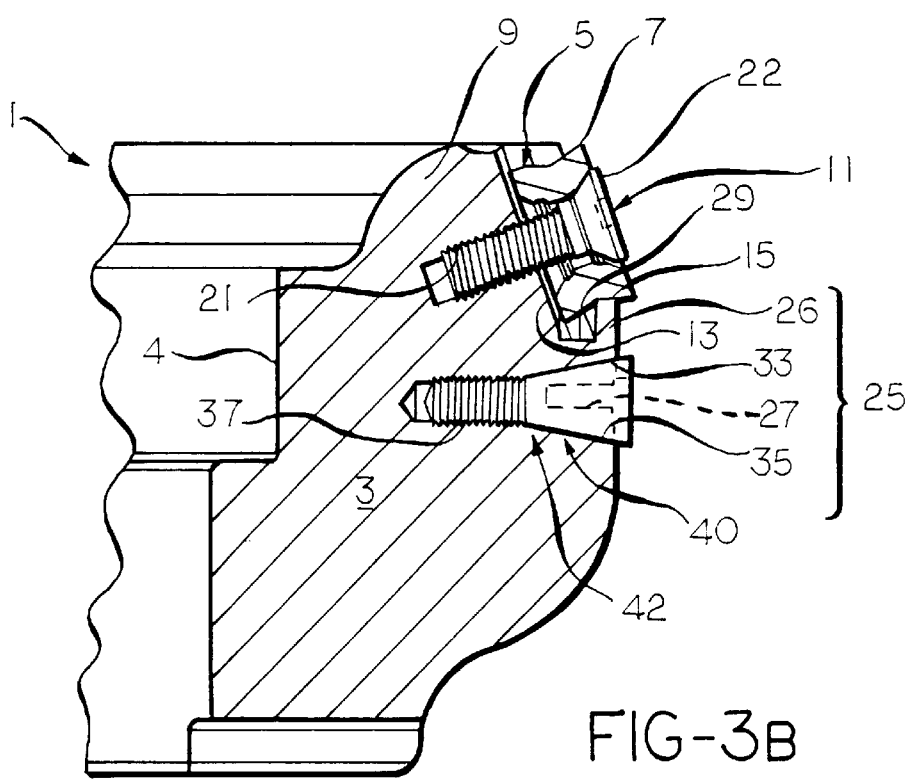

DEVICE AND METHOD FOR ADJUSTING THE POSITION OF CUTTING INSERTS MOUNTED IN A CUTTING TOOL

BACKGROUND OF THE INVENTION

This invention generally relates to adjusting devices for cutting tools and is specifically concerned with a device for adjusting the position of the cutting edge of an insert mounted onto the body of a tool such as a milling cutter.

Devices for adjusting the position of cutting inserts in milling cutters and other tools are known in the prior art. However, before such adjusting devices are described, a brief description of the mechanical context of such devices will be given.

Milling cutters have a generally cylindrical tool body. A plurality of cutting inserts are mounted around the periphery of the body of the milling cutter in recesses known as "pockets" that conform to the shape of two of the sides of the inserts. Each insert is secured into its respective pocket by means of a clamping screw which extends through a centrally-located hole in the insert. While pockets and clamping screws provide a secure mount for the inserts during a cutting operation, they do not, unfortunately, provide the system operator with any means for making fine adjustments in the position of the cutting edges of the inserts mounted around the periphery of the milling cutter. This is unfortunate, since even small misalignments between the edges of the cutting inserts on the order of 0.001 inch can result in tool marks in the workpiece known in the art as "tracking." Even if the pockets were perfectly machined to the desired dimension, the inserts themselves can easily vary in size 0.001 of an inch or more due to manufacturing tolerances or uneven wear during use.

To solve this problem, devices for making small adjustments in the position of the cutting inserts in such tools were developed in the prior art. In one of the most common designs, one of the walls of the insert-receiving pockets in the tool body is replaced with a wedge-shaped member that is slidably mounted onto the body of the milling cutter or other tool by means of one or more adjustment screws. The screws are turned in order to slide the wedge-shaped body in a direction which can move the cutting edge of the insert either upwardly or downwardly with respect to the cutting edges of the other inserts mounted around the body of the milling cutter.

While such a prior art devices are capable of aligning the cutting edges of the inserts to an extent to where tracking is substantially or completely eliminated, the applicants have observed a number of shortcomings associated with such devices. For example, the metal-to-metal contact between the wedge-shaped element and the body of the milling cutter often creates, on a microscopic level, an irregular sticking friction (known as "stiction" in the art) which results in irregular movement of the sliding wedge element as the adjustment screw is turned. Such stiction coupled with the fact that even a partial turn of the adjusting screw moves the wedge-shaped element a relatively large distance on a microscopic level often causes the system operator to overshoot his intended positioning goal (which may be as small as 0.0005 inches). The resulting overshooting of the position goal in turn requires the system operator to loosen the adjustment screw and start over, thus creating an undesirable amount of unproductive downtime for the milling cutter or other tool. Another shortcoming of such a design is that it requires the manufacture and assembly of additional precision parts onto the body of the milling cutter. This of course results in higher manufacturing costs. Finally, it is possible for the adjustment screws used in such devices to loosen slightly from the vibrations associated with the machining operation, thus causing the cutting edge of the insert to shift out of position.

Clearly there is a need for a device for making fine adjustments to the position of cutting inserts mounted around a milling cutter or other tool in order to eliminate undesirable tracking in the workpiece which is easier and faster to use than prior art adjusting devices. Ideally, such an adjusting device would require the manufacture and assembly of fewer precision parts so as to minimize the cost of the resulting adjustable milling cutter or other tool, and would resist becoming loosened from the shock and vibration caused by the machining operation. Finally, it would be desirable if such an adjusting device could be easily installed onto existing milling cutters and other types of cutting tools.

SUMMARY OF THE INVENTION

Generally speaking, the invention is a device and method for adjusting the position of a cutting insert relative to the body of a cutting tool that overcomes all of the aforementioned shortcomings associated with the prior art. To this end, the device of the invention comprises a mounting assembly for mounting an insert onto the tool body, a cantilevered wall or rib integrally connected to the tool body for supporting a side of the insert, and means which may take the form of a wedging mechanism for elastically flexing the cantilevered wall to adjust the position of a cutting edge of an insert secured onto the tool body by the mounting assembly.

The mounting assembly may include a pocket for receiving and securing an insert, and the cantilevered wall may form a portion of the wall of the pocket. The wedge mechanism may include the combination of a wedge disposed in engagement against the cantilevered wall in combination with a screw. When the screw is turned, the wedge elastically flexes the cantilevered wall a small distance in order to effect a fine adjustment of the cutting edge of an insert mounted within a pocket of the mounting assembly. In the preferred embodiment, the wedge is a conical head of a screw and the cantilevered wall includes a complementarily-shaped arcuate recess for receiving the screw head. The conical head of the screw is tapered at a shallow angle relative to its axis of rotation (i.e., between about 5° and 25°) and the pitch of the screw thread is preferably fine (i.e., 32 threads per inch) so that a 90° turn of the conical headed screw deflects the cantilevered wall approximately 0.0005 inches.

The mounting assembly of the device may further include a clamping screw that extends through a hole in the insert in conventional fashion. However, the inner diameter of the hole in the insert is preferably between about 0.0010 and 0.0060 of an inch larger than the outer diameter of the clamping screw so that the engagement between the clamping screw and the insert will not impose an excessive amount of resistance against the flexing of the cantilevered wall by the wedge mechanism.

In the method of the invention, a recess is provided in a tool body adjacent to an insert receiving pocket so that a portion of the pocket wall is defined by a cantilevered wall integrally connected to the tool body. Next, a means for elastically flexing the cantilevered wall is provided in the tool body, which may take the form of the previously described wedge mechanism. A cutting insert is then secured into the pocket of the mounting assembly. In the last step of the method, the cantilevered wall that forms a portion of the pocket wall is flexed by the wedge mechanism.

Advantageously, the slight flexing of the integrally-connected, cantilevered wall provides an adjustment mechanism which is easily and highly controllable for fine position adjustments. The reactive force that the cantilevered wall applies to the conical head of the screw eliminates backlash and assists in locking the screw in position so that it will not loosen as a result of the shock and vibration associated with a machining operation. Moreover, the installation of the adjustment mechanism does not require the addition of precision machined, wedge-shaped pocket walls. The method of the invention advantageously provides an easy technique for installing and using the position adjusting device on a conventional milling head, boring tool, or any other cutting tool having a tool body with insert-receiving pockets.

BRIEF DESCRIPTION OF THE SEVERAL FIGURES

FIGS. 3A and 3B are partial, cross-sectional side views of the milling cutter illustrated in FIG. 1 showing the insert, clamping screw, and wedge mechanism of the invention in exploded and assembled forms, respectively;

DETAILED DESCRIPTION OF THE PREFERRED EMBODIMENT

Figure 1:
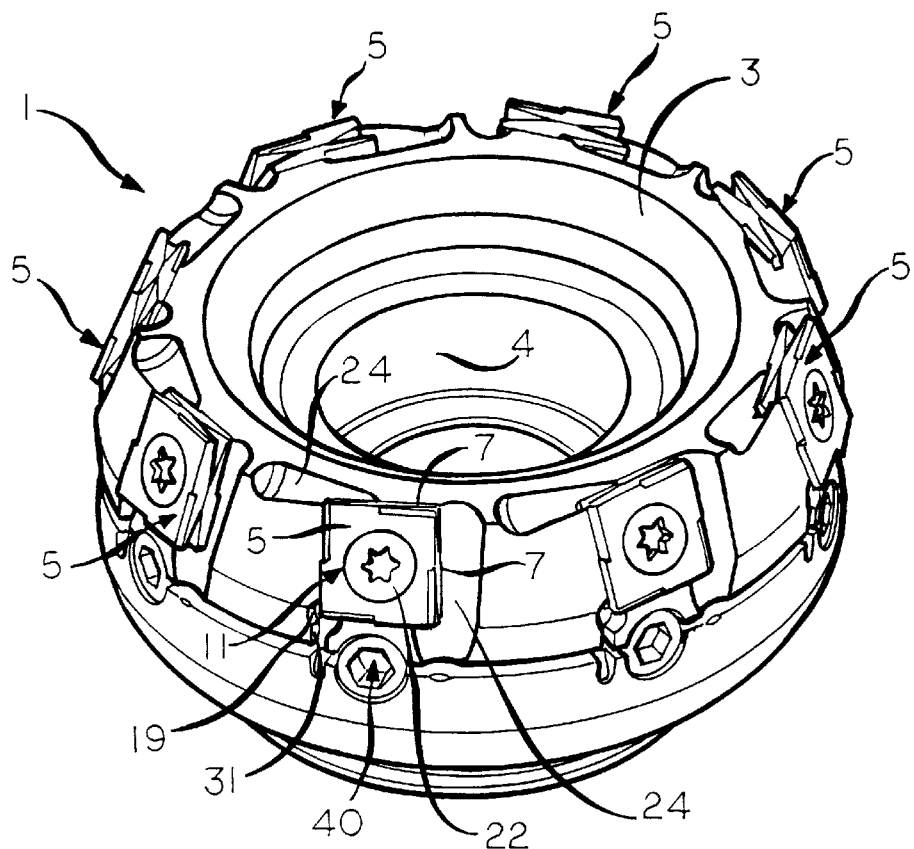
FIG. 1 is a perspective view of a milling cutter that includes the insert-adjusting device of the invention.
Figure 2:
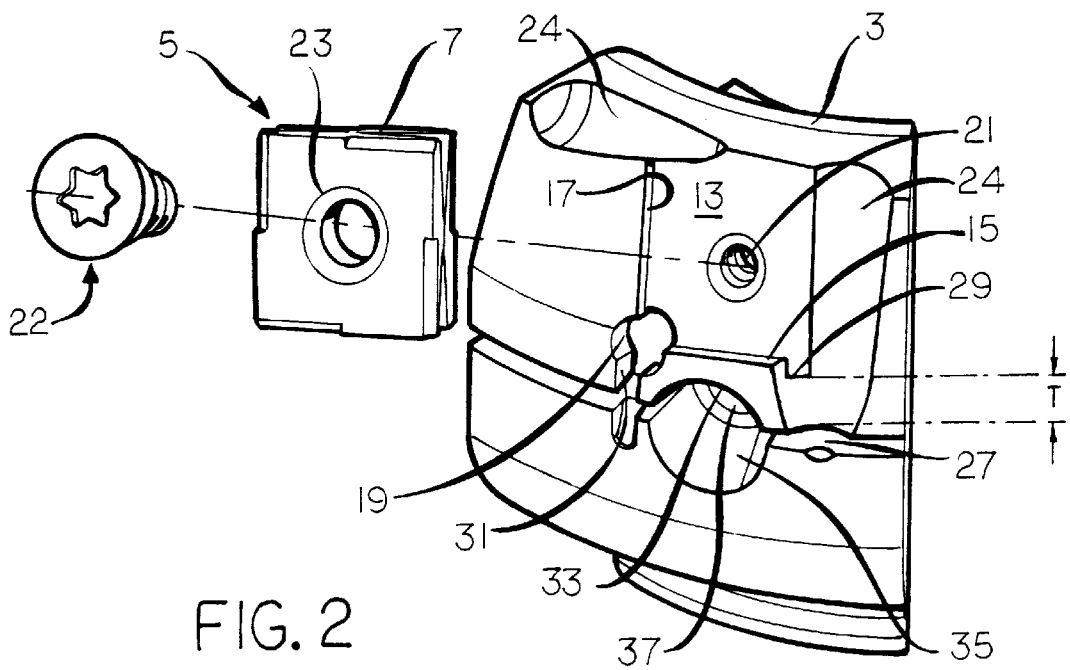
FIG. 2 is a front, exploded view of one of the insert-mounting assemblies spaced around the periphery of the milling cutter illustrated in FIG. 1.

With reference now to FIGS. 1 and 2, wherein like numerals designate like components throughout all of the several Figures, the position-adjusting device of the invention is adapted for use on a milling cutter 1 having a tool body 3 with a cylindrical recess 4 for receiving a spindle adapter (not shown). A plurality of cutting inserts 5 with cutting edges 7 are uniformly secured around the upper periphery 9 of the tool body 3 by means of mounting assemblies 11. Each mounting assembly 11 includes a pocket 13 having a lower support surface 15 and a side support surface 17 for receiving and supporting a cutting insert 5. A corner relief recess 19 is provided between the lower and side support surfaces 15,17 so that the corner of the insert 5 held within the pocket 13 does not come into contact with any rigid surfaces (which could cause chipping or cracking at the insert corner). Mounting assembly 11 further includes a threaded bore 21 that extends from the floor of the pocket 13 into the tool body 3 for receiving the threaded shank of a clamping screw 22 insertable through a centrally disposed hole 23 in the insert 5. While the mounting assembly 11 disclosed throughout the specification utilizes a pocket 13 in combination with a clamping screw 22 that extends through the body of the insert 5 in order to secure the insert 5 onto the tool body 3, the invention is equally applicable to mounting assemblies that utilize the combination of a pocket 13 and a clamping finger (not shown) that maintains the insert 5 within the pocket 13. Chip gullets 24 are provided at the periphery of the insert-receiving pocket 13 to provide space for the expulsion of metal chips during a machining operation.

The position-adjusting device 25 includes a cantilevered wall or rib 26 which, as best seen in FIGS. 3A and 3B, is integrally connected to the tool body 3. In the preferred embodiment, the cantilevered wall 26 defines the lower wall of the insert-receiving pocket 13. The wall 26 is defined by a lower slot 27 and, in this particular embodiment, an upper slot 29. Wall 26 is separated from the side support surface 17 of the pocket 13 by a side slot 31 that extends downwardly from the corner relief recess 19, as best seen in FIG. 2. In this particular embodiment, the addition of an upper slot 29 is necessary to render the thickness T of the cantilevered wall 26 sufficiently small to allow the wedge mechanism to flex it a few thousandths of an inch upwardly. When the tool body 3 is formed from a low alloy steel (such a 4441 or 4340), the thickness T (shown in FIG. 2) should be about 0.10 inches. As a result of the fact that the cantilevered wall 26 is formed by the cutting of slots 27,29,31 in the tool body 3, it is integrally connected to the tool body 3 as shown in FIGS. 3A and 3B.

With reference to FIGS. 2, 3A, and 3B, an arcuate recess 33 is provided in the lower half of the cantilevered wall 26. Another arcuate recess 35 is provided around the upper edge of the slot 27. These two recesses 33,35 define a single, frustro-conical recess that leads into a threaded bore 37 for receiving the wedge mechanism 40 of the position-adjusting device 25. In the preferred embodiment, the wedge mechanism 40 is a screw 42 having a conical head 44. With reference in particular to FIG. 3A, the taper angle A of the conical head 44 with respect to the axis of rotation of the screw 42 is between 5° and 25°. Such a shallow taper enhances the amount of fine control that the system operator has in flexing the cantilevered wall 26 upwardly to adjust the position of the cutting edge 7 of the insert 5 without undesirable overshooting. Additionally, the threaded shank 46 of the screw 42 is provided with a large number of threads (preferably at least 32 threads per inch) for the same purpose. When the conical head 44 of the screw is tapered at an angle of approximately 25°, and the shank 46 has 32 threads per inch, a 90° turn of the screw will flex the cantilevered wall 26 upwardly approximately 0.0005 inches. The fine pitch of the threads of shank 46 not only enhances control, but also helps to insure that the screw 42 will not loosen due to the mechanical shock and vibration associated with a milling cutting operation. As further assurance, the threads of the shank 46 may be treated with a Nylox or other plastic coating so that the screw 42 remains in exactly the same position despite whatever shock and vibration is generated by the milling cutter 1. A hexagonal recess 48 is centrally provided at the end of the conical head 44 of the screw 42 for receiving the end of an adjusting wrench.

Figure 4:
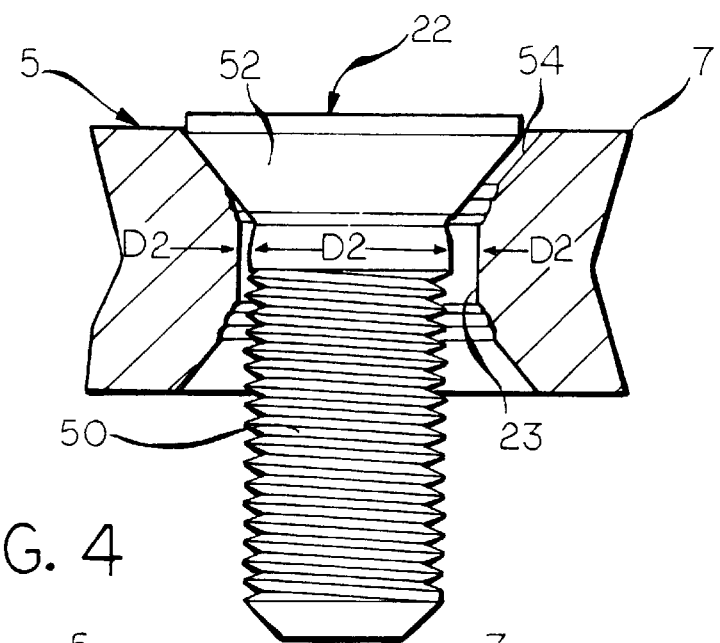
FIG. 4 is a cross-sectional side view of the insert and clamping screw, illustrating the clearance between the outer diameter of the clamping screw shank and the inner diameter of the mounting hole of the insert.

With reference now to FIG. 4, the diameter D1 of the threaded shank 50 of the insert clamping screw 22 is between about 0.0010 and 0.0060 of an inch smaller than the inner diameter D2 of the centrally disposed hole 23 in the insert 5. In the preferred embodiment, the difference between D1 and D2 is about 0.003 of an inch. Such dimensioning allows the system operator to turn the screw 42 of the wedge mechanism 40 to adjust the cutting edge 7 of the insert 5 upwardly a couple of thousandths of an inch without the need for loosening the insert clamping screw 22, although screw 22 could, of course, be loosened slightly if desired. Clamping screw 22 further includes a conical head 52 that partially engages conical walls 54 of the insert 5 that lead into hole 23 when the screw 22 is snugged against the insert 5. It should be noted that the combined resistance that both the clamping screw 22 and the cantilevered wall 26 applies to the conical head 44 of the screw 42 of the wedge mechanism 40 not only prevents undesirable overshooting of the desired position of the cutting edge 7 of the insert 5 during an adjustment, but also eliminates backlash and functions to maintain the insert 5 into the desired position regardless of the amount of shock and vibration that is applied to the insert 5 during the subsequent machining operation.

In operation, the system operator installs all of the inserts 5 onto the body 3 of the milling cutter 1 via the previously described mounting assemblies 11 by pressing the inserts into engagement against pocket surfaces 15 and 17 and tightening the insert clamping screws 22 to a desired torque. All during this step, the screw 42 of the wedge mechanism 40 is completely loosened so that the cantilevered wall 26 is not elastically flexed by the conical head 44 of the screw. The position of the cutting edges 7 of each of the cutting inserts 5 disposed around the periphery of the cutter 1 are then determined by a positioning gauge (not shown). Such gauges are well known in the art, and form no part of the instant invention. All of the cutting edges 7 that are lower than the highest of these edges is then carefully raised by the system operator by turning the screw 42 of the wedge mechanism 40 counterclockwise so that the conical head 44 of the screw 42 flexes the cantilevered wall 26 upwardly. After all of the cutting edges 7 have been brought into precise alignment with one another via the screw 42 of the position-adjusting devices 25, the milling cutter 1 is then mounted onto the shank of a spindle (also not shown).

Figure 5:
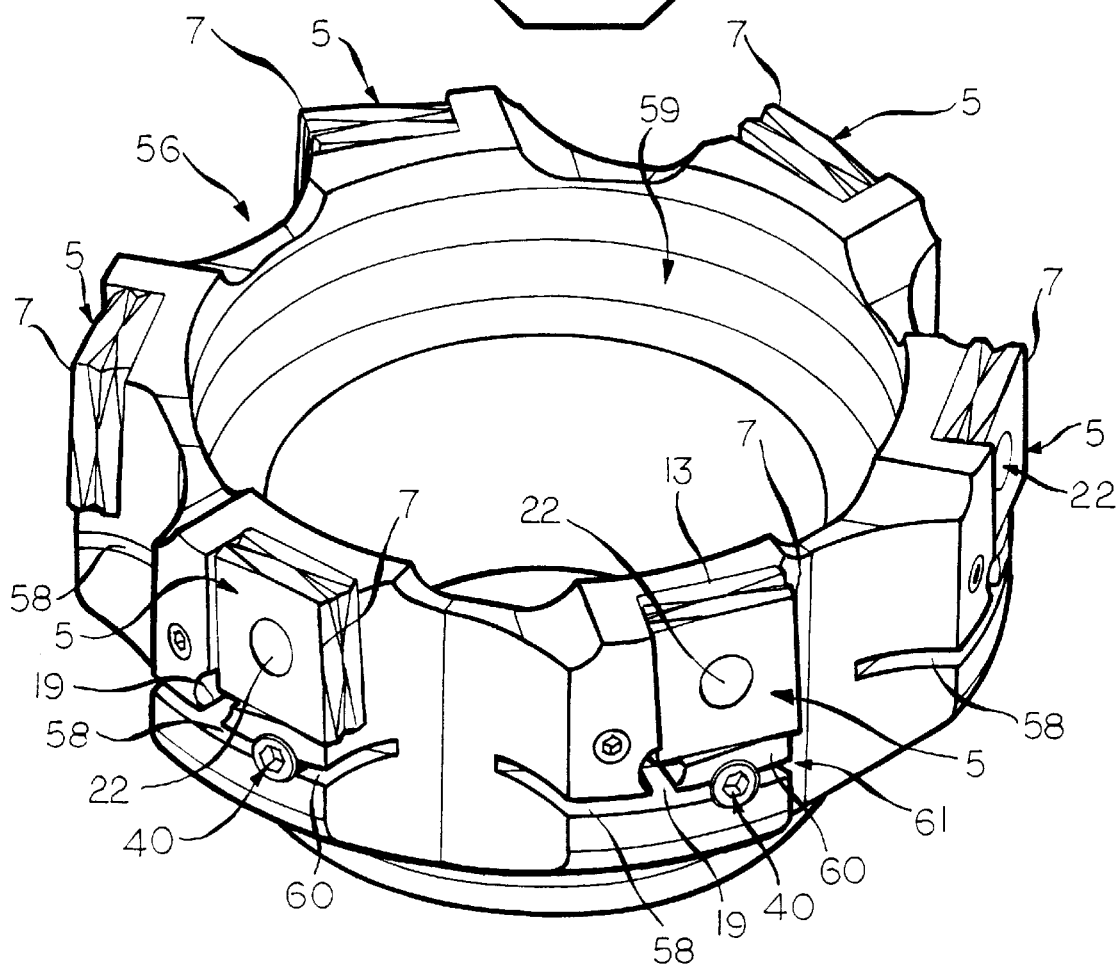
FIGS. 5 and 6 are a perspective and a plan view of different types of milling cutters that have been retrofitted with the position-adjusting device of the invention.
Figure 6:
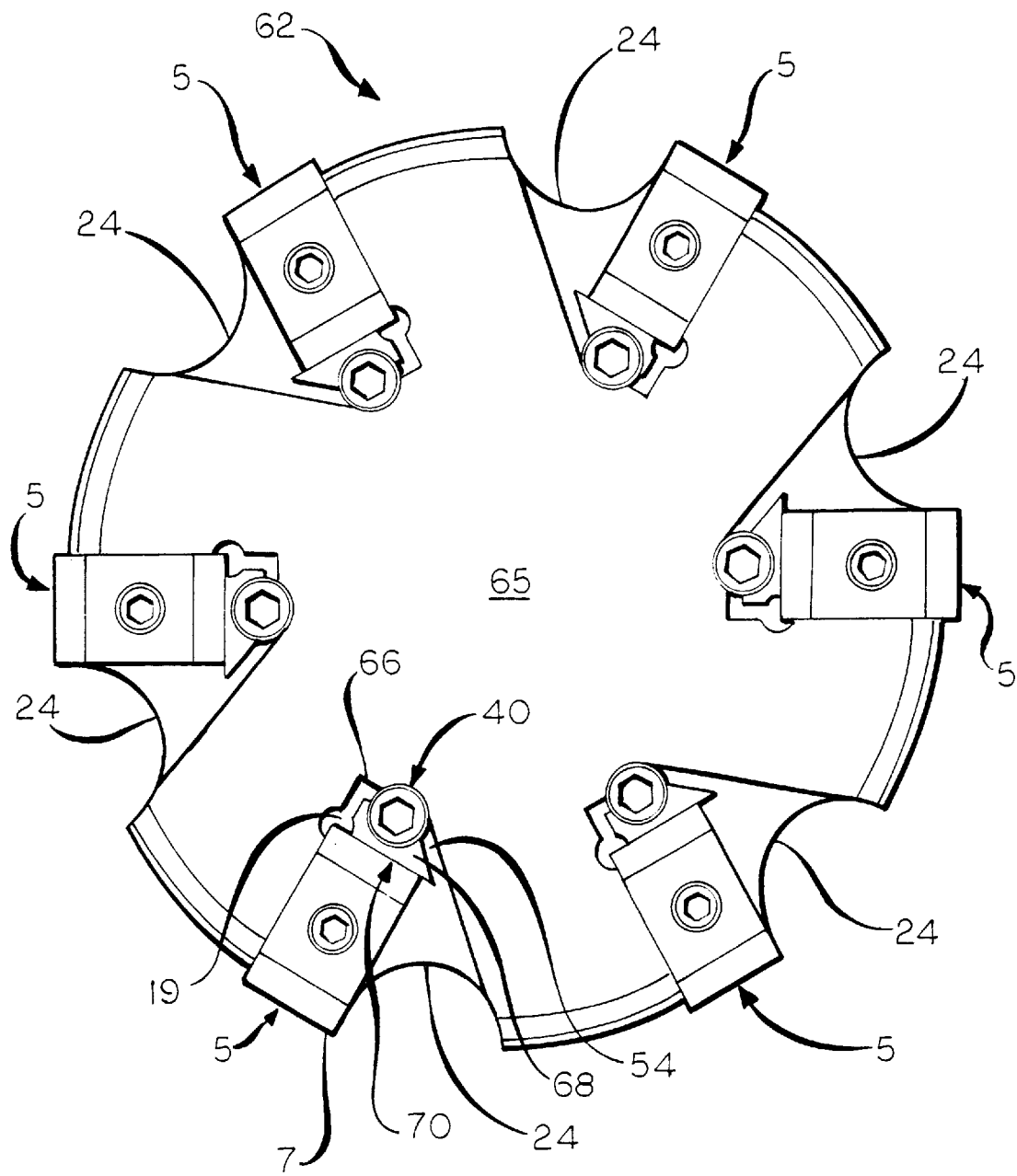

FIGS. 5 and 6 illustrate how the position-adjusting device 25 of the invention may be installed onto different types of prior art milling cutters 56,62, respectively. In FIG. 5, a circumferential slot 58 is cut into the body 59 of the cutter 56 just below the lower support surface 15 of the insert-receiving pocket 13. The provision of this slot 58 creates a cantilevered wall 60. In this particular cutter design, it is not necessary to add a side slot in order to separate the cantilevered wall 60 from the side support surface of the pocket 13, as the corner relief recess 19 is large enough to create such a separation. The circumferential slot 58 is cut close enough to the lower support surface 15 so that the thickness of the resulting cantilevered wall 60 is thin enough to flex when a wedge mechanism 40 is installed, yet thick enough to securely support the insert 5 during a milling operation. Such a thickness may be, for example, 0.10 inches. After the installation of the slot 58 and wedge mechanism 40, the resulting position-adjusting device 25 is operated in the same manner as described with respect to device 25. With respect to the cutter 62 illustrated in FIG. 6, it is necessary to add an angular slot 64, a straight slot 66, and a radially-oriented slot 67 between the corner relief recess 19 and slot 66 in order to create the desired integrally connected, cantilevered wall 68. A wedge mechanism 40 as previously described is then added by drilling and tapping a bore counter-sinking the upper portion of the bore to create arcuate recesses in the wall 68 and in the slot 66, and by finally installing a screw 42 with a conical head 44. The resulting position adjusting device 70 is operated as previously described with respect to device 25.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A device for adjusting the position of a cutting insert relative to a body of a cutting tool, comprising:

a mounting assembly for mounting said insert onto said tool body, said mounting assembly including a pocket having a lower support surface and a side support surface in said tool body for receiving the insert;

a cantilevered wall integrally connected at least in part to said tool body, said cantilevered wall defined by a lower slot, an upper slot, a side slot and a chip gullet, said cantilevered wall separated from said side support surface by the side slot and terminating at said side slot and said chip gullet, said cantilevered wall extending radially outwardly from said tool body and upwardly above said upper slot to the lower support surface for supporting a side of said insert; and means for elastically flexing said cantilevered wall to adjust a position of the insert mounted onto said tool body by said mounting assembly.

2. The device of claim 1, wherein said flexing means includes a wedge mechanism in engagement against said cantilevered wall.

3. The device of claim 2, wherein said wedge mechanism includes a conical wedge.

4. The device of claim 1, wherein said flexing means includes a screw threadedly engaged to the tool body.

5. The device of claim 1, wherein said cantilevered wall defines a portion of said pocket.

6. The device of claim 1, wherein said mounting assembly includes a clamping screw threadedly engaged to the tool body for securing said insert to said tool body.

7. The device of claim 6, wherein said clamping screw extends through a hole in said insert.

8. The device of claim 3, wherein said conical wedge is tapered at an angle of between about 25° to 5°.

9. The device of claim 3, wherein said cantilevered wall includes an arcuate recess for receiving a side of said conical wedge.

10. A device for adjusting the position of a cutting insert relative to a body of a cutting tool, comprising:

a mounting assembly including a pocket in said tool body having a lower support surface and a side support surface for receiving and securing said insert;

a cantilevered wall integrally connected at least in part to said tool body, said cantilevered wall defined by a lower slot, an upper slot, a side slot and a chip gullet, said cantilevered wall separated from said side support surface by the side slot and terminating at said side slot and said chip gullet, said cantilevered wall extending radially outwardly from said tool body and upwardly above said upper slot to the lower support surface and defining a portion of said pocket for supporting a side of said insert; and means for elastically flexing said cantilevered wall to adjust a position of a cutting edge of the insert mounted onto said tool body by said mounting assembly.

11. The device of claim 10, wherein said flexing means includes a wedge mechanism having a wedge in engagement against said cantilevered wall that is connected to a screw threadedly engaged to said tool body.

12. The device of claim 11, wherein said wedge is conical.

13. The device of claim 12, wherein said conical wedge is tapered at an angle of between about 25° to 5°.

14. The device of claim 10, wherein said cantilevered wall is between about 0.08 to 0.12 inches in thickness, and terminates in a free end on one side and a side slot on another side which separates said cantilevered wall from another wall of said pocket.

15. The device of claim 14, wherein said cantilevered wall includes an arcuate recess for receiving a side of said conical wedge.

16. The device of claim 10, wherein said mounting assembly includes a clamping screw threadedly engaged to the tool body for securing said insert to said tool body.

17. The device of claim 16, wherein said insert includes a round hole for receiving a shank of said clamping screw, said bore having an inner diameter that is between about 0.001 and 0.006 of an inch larger than the outer diameter of said clamping screw shank.

18. The device of claim 10, wherein said cantilevered wall supports a side of said insert that is opposite from a cutting edge of said insert.

19. The device of claim 10, wherein said device comprises a plurality of said insert mounting assemblies, each pocket of which is defined at least in part by a cantilevered wall integrally connected to said tool body, and further including a plurality of said means for flexing each of said cantilevered walls to adjust a position of a cutting edge of an insert.

20. The device of claim 19, wherein said cutting tool is a milling cutter.

21. The device of claim 19, wherein said cutting tool is a boring tool.

22. A method for adjusting the position of a cutting insert relative to a body of a cutting tool, wherein said tool has a mounting assembly including a pocket having walls for receiving and securing the insert to said tool body, comprising the steps of:

providing an insert-receiving pocket in said tool body such that a portion of said pocket wall is defined by a cantilevered wall integrally connected at least in part to said tool body, said cantilevered wall defined by a lower slot, an upper slot, a side slot and a chip gullet, said cantilevered wall separated from said side support surface by the side slot and terminating at said side slot and said chip gullet, said cantilevered wall extending radially outwardly from said tool body and upwardly above said upper slot to the lower support surface for supporting a side of said insert;

providing a means for elastically flexing said cantilevered wall;

securing the cutting insert into said pocket of said mounting assembly; and flexing said cantilevered wall with said flexing means to adjust a position of a cutting edge of said insert.

23. The method of adjusting the position of a cutting insert as defined in claim 22, wherein said cantilevered wall is provided by cutting at least one slot in said tool body parallel to a portion of said pocket walls.

24. The method of adjusting the position of a cutting insert as defined in claim 22, wherein said flexing means includes a wedge connected to a screw threadedly engaged to said tool body, and wherein said cantilevered wall is flexed by turning said screw to engage said wedge against said cantilevered wall.

25. The method of adjusting the position of a cutting insert as defined in claim 24, wherein said flexing means is a conical-headed screw, and wherein said cantilevered wall is flexed by turning said screw to engage said conical head of said screw against said cantilevered wall.

* * * * *